117,338

UNITED STATES PATENT OFFICE.

CICERO A. SIMMONS, OF WALDO, FLORIDA.

IMPROVEMENT IN MEDICAL COMPOUNDS FOR LIVER AND OTHER DISEASES.

Specification forming part of Letters Patent No. 117,338, dated July 25, 1871.

*To all whom it may concern:*

Be it known that I, CICERO A. SIMMONS, of Waldo, in the county of Alachua and State of Florida, have invented a new and useful Improvement in Medical Compound; and I do hereby declare that the following is a full, clear, and exact description thereof, which will enable others skilled in the art to make and use the same.

This invention relates to a new and useful improvement in the curative art, and consists in a compound composed of the ingredients and in about the proportions hereinafter named.

In carrying out my invention and discovery I make use of the following ingredients in the manner described, forming a liquid medical compound possessing very valuable medical properties, viz.: senna, thirteen ounces; buchu, two ounces; rad. serpentaria Virginiana, six ounces; bitter-root, four ounces; prunus Virginiana, four ounces; cinchona, three ounces.

The above ingredients are combined and their virtues secured by pursuing the following process: The senna and buchu are placed in an earthen vessel and ten pints of boiling water poured thereon. The vessel is covered to prevent the escape of steam, and after standing undisturbed twenty-four hours six pints of proof-spirits are added, and the whole is allowed to stand twenty-four hours more. The serpentaria and bitter-root are treated in the same manner, but with six pints of boiling water and two pints of alcohol. The prunus Virginiana and cinchona are treated with four pints boiling water and two pints alcohol. When the three divided portions of the compound have, as above mentioned, been allowed to stand twenty-four hours in the spirits, they are mixed together and well stirred and allowed to stand for the space of twenty-four hours, when the composition is well strained through linen or cotton cloth, and is ready for use.

This compound produces a healthy action upon the liver, stomach, and kidneys, and is a most valuable medicine in the treatment of all bilious affections.

Having thus described my invention, I claim as new and desire to secure by Letters Patent—

The above medical compound, substantially as described.

CICERO A. SIMMONS.

Witnesses:
    W. L. SIMS,
    E. B. TIMMONY.